J. E. Emerson,
Saw.
No. 102,520.          Patented May 3, 1870.
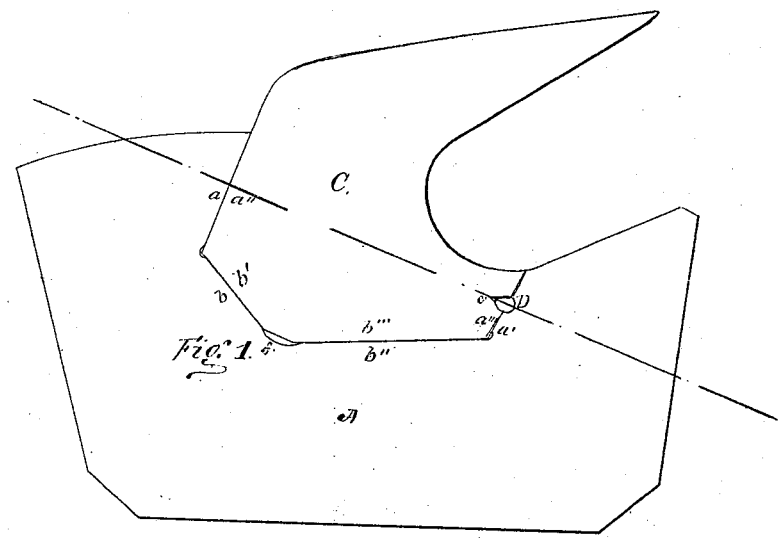
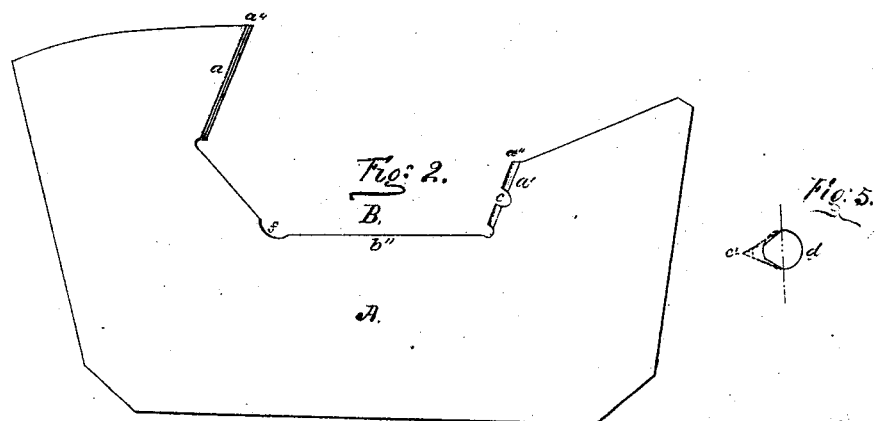
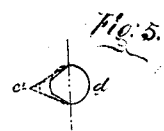
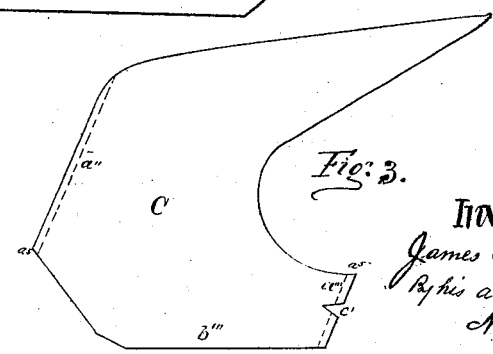
Witnesses:
Chas. E. Watson
James L. Grinnell
Inventor:
James E. Emerson
By his atty.
N. Cranford

UNITED STATES PATENT OFFICE.

JAMES E. EMERSON, OF TRENTON, NEW JERSEY.

IMPROVEMENT IN SAWS.

Specification forming part of Letters Patent No. 102,520, dated May 3, 1870.

*To all whom it may concern:*

Be it known that I, JAMES E. EMERSON, of Trenton, in the county of Mercer, in the State of New Jersey, have invented certain Improvements in Saws, of which the following is a specification.

The object of this invention is to improve upon the present mode of inserting the removable teeth in the plate or blade of a saw; and it consists in the manner of forming the recess in the saw-plate to receive the shank of the tooth, the shank of the tooth to fit in the recess, and in the manner or means used in holding the tooth in the blade when inserted.

In the drawings, Figure 1 is a view of a section of a saw-plate with a tooth inserted. Fig. 2 is a section of the saw-plate, and showing the recess. Fig. 3 is a side view of the tooth. Fig. 4 is a cross-section of the blade and tooth, and Fig. 5 is an enlarged view of the rivet and rivet-hole.

It is a well-understood fact among saw-makers that it is a difficult thing to insert a tooth in a saw-blade and have the proper abutting surfaces on the tooth and in the plate, as that there will be little or no wear to the parts that come in contact, and at the same time effectually resist the tendency to spread the plate or tooth in swaging the teeth; and it is also well known that where a holding-rivet is used to retain the tooth in its place in the plate there is great danger in upsetting the rivet of getting the saw-rim bound, or so springing the saw-plate at or near its periphery as to become useless for sawing; and to avoid such difficulties this invention is made.

A is the saw blade or plate; B, the recess cut in the saw-plate to receive the shank of the tooth C. This recess has four different sides and all on straight lines. The sides $a$ and $a'$ of the recess are parallel, or nearly so, with each other, and have projecting ribs $a^4$, that fit into V-shaped grooves $a^5$ on the sides $a''$ and $a'''$ of the shank of the tooth C. The sides $b$ and $b''$ of the recess B and $b'$ and $b'''$ of the tooth are plane surfaces, and have neither grooves nor ribs, but simply straight faces, that are intended to meet and form abutting surfaces to better resist the thrust of the tooth in its work and the effect produced in swaging the point of the tooth, for where the parts that receive the greatest strain in the operation of either sawing or swaging are tongued and grooved the tendency is to spread that part that has the groove in it and make the extreme edges project and become upset. From such cause the tooth becomes loose, and will be liable to be thrown out of the blade; but with plane straight surfaces of the tooth and recess where they meet and where the greatest force is to be resisted no spreading of either tooth or plate is produced and no wear is perceptible; hence the tooth remains fast. The forward part of the shank of the tooth projects far enough into the saw-plate to receive all the sawdust as it is forced onward in the operation of sawing into the throat or dust-space, and receives all the wear consequent upon such contact of the dust, and thereby saves the plate from being worn away into bad shape; and when a new tooth is inserted the saw in every respect assumes the original condition it had when new. The tooth, when so formed, is easily inserted in the recess by simply sliding the tooth into place.

In order to hold the tooth in the saw-plate securely and at the same time prevent any buckling of the plate, a hole, D, is made to receive a rivet of the form in cross-section seen in Fig. 5 at $d$. This hole is made partly in the saw-plate and partly in the shank of the tooth, and that part of the hole $c$ that is in the saw-plate is the half of a circle, while that part in the shank of the tooth is angular or V-shaped, as seen in Figs. 1 and 3 at $c'$. The purpose of this form of hole is to do away with the countersink on each side of the saw-plate and tooth made to receive the upset of the rivet, which in the above-described invention is received in the acute-angular space $c'$ in the shank of the tooth, and will not only hold the tooth firmly in its place, but the expansion of the rivet in upsetting it is into the angle $c'$, which forces the tooth back into the recess and firmly against the abutting surfaces $b$ $b'$ and tongued-and-grooved sides $a$ and $a'$, by which means the tooth will always have a firm and sure bearing where most wanted, the saw free from any liability of being rim-bound or tight in consequence of setting the rivet too hard into the countersinks, as is often the case in the method when unskilled workmen are employed in inserting the teeth; but by constructing the rivet-hole as above described and using the shape of rivet shown all the liability of getting the saw rim-bound is avoided, as the angular part of the hole will receive the expansion of the rivet as it is upset, and when so upset to the proper point the ends are dressed off even with the sides of the saw, leaving no burr on the ends of the rivet at either end, and it can be punched out at any time quickly and without danger to either saw or tooth. After the rivet is drawn out by a punch the tooth is removed from the recess by inserting the punch in hole $f$ at the bottom and rear end of the recess B.

Having thus fully described my invention, what I claim, and desire to secure by Letters Patent, is—

1. Securing insertible teeth in the plate of a saw in the manner and by the means herein described.

2. The saw-tooth C, provided with the angular aperture $c'$, saw-plate A, provided with a semicircular aperture, $c'$, in combination with rivet $d$, all the parts constructed in the manner and for the purposes described.

JAMES E. EMERSON.

Witnesses:
   EDM. BROWN,
   NEWTON CRAWFORD.